United States Patent
Johannsen

(10) Patent No.: US 12,466,500 B2
(45) Date of Patent: Nov. 11, 2025

(54) IDLER ADJUSTMENT ASSEMBLY

(71) Applicant: Caterpillar Inc., Peoria, IL (US)

(72) Inventor: Eric J. Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 503 days.

(21) Appl. No.: 17/663,590

(22) Filed: May 16, 2022

(65) Prior Publication Data

US 2023/0365208 A1  Nov. 16, 2023

(51) Int. Cl.
*B62D 55/15* (2006.01)
*B62D 55/30* (2006.01)
*B62D 55/32* (2006.01)

(52) U.S. Cl.
CPC .......... *B62D 55/15* (2013.01); *B62D 55/305* (2013.01); *B62D 55/32* (2013.01)

(58) Field of Classification Search
CPC ...... B62D 55/30; B62D 55/305; B62D 55/15; B62D 55/32
See application file for complete search history.

(56) References Cited

U.S. PATENT DOCUMENTS

| | | | |
|---|---|---|---|
| 2,511,098 A * | 6/1950 | Bridwell | B62D 55/30 |
| | | | 305/154 |
| 2,789,438 A | 4/1957 | Hutchinson | |
| 2,926,969 A * | 3/1960 | Ashley, Jr. | B62D 55/30 |
| | | | 305/153 |
| 3,382,013 A * | 5/1968 | Toth | B62D 55/30 |
| | | | 384/424 |
| 5,145,241 A | 9/1992 | Baylor | |
| 7,100,715 B2 | 9/2006 | Mukaino et al. | |
| 7,237,631 B2 | 7/2007 | Livesay et al. | |
| 2006/0049692 A1 | 3/2006 | Livesay et al. | |
| 2007/0057575 A1* | 3/2007 | Brandt | B62D 55/32 |
| | | | 305/136 |
| 2013/0154346 A1 | 6/2013 | Beasley et al. | |
| 2016/0176455 A1 | 6/2016 | Nuechterlein | |
| 2018/0057083 A1* | 3/2018 | France | B62D 55/15 |
| 2020/0398912 A1 | 12/2020 | Sauvageau et al. | |
| 2021/0039729 A1 | 2/2021 | Hakes | |
| 2021/0046981 A1* | 2/2021 | Donlan | B62D 55/0887 |

FOREIGN PATENT DOCUMENTS

| | | | |
|---|---|---|---|
| GB | 1160866 A | * | 8/1969 |
| GB | 2536635 | | 9/2016 |
| KR | 102331512 B1 | | 11/2021 |

* cited by examiner

*Primary Examiner* — Kip T Kotter

(57) ABSTRACT

An idler adjustment assembly includes a support block; a first set of one or more adjustment components to move a first wear component between a first plurality of positions that are adjacent to an external surface of a first side of the support block; a second set of one or more adjustment components to move a second wear component between a second plurality of positions that are adjacent to an external surface of a second side of the support block; a first set of one or more alignment components to maintain a first alignment of the first wear component relative to the external surface of the first side of the support block; and a second set of one or more alignment components to maintain a second alignment of the second wear component relative to the external surface of the second side of the support block.

20 Claims, 6 Drawing Sheets

IDLER ADJUSTMENT ASSEMBLY

TECHNICAL FIELD

The present disclosure relates generally to a track system for a track-type machine and, for example, to an idler adjustment assembly of the track system.

BACKGROUND

Track-type machines, for example dozers, excavators, and skid-steer loaders, are commonly used in applications where traction is critical or low ground pressure is important. Such a machine may include a frame that supports an internal combustion engine, and left and right tracks that transfer power from the engine to a ground surface. Each of the tracks typically includes an idler (also referred to as an idler wheel).

The idler is a rolling element that passively rolls against an inner side of the track and is configured to engage with other components of the track to facilitate operation of the track (e.g., to enable movement of the machine along the ground surface). Depending on a level of the ground surface and/or a work application of the machine, the idler may need to be adjusted (e.g., a position of the idler within the track may need to be adjusted) to ensure that the track smoothly rolls (e.g., with minimal bounce) across the ground surface (e.g., by causing "an impact region" of the track to impact the ground surface at an angle within a particular angle range). Furthermore, from time to time, over a course machine operation, the idler and the other components of the track undergo wear and the idler may therefore need to be readjusted. Adjusting (and readjusting) the idler can be a time-consuming and labor-intensive task that is prone to error (e.g., the idler may not be adjusted to an optimal position within the track), which can affect a performance and an operable life of the idler, the other components of the track, the track, and the machine.

U.S. Pat. No. 7,237,631 (the '631 patent) discloses a vertical idler adjuster that includes at least one removable spacer to adjust a vertical position of an idler shaft relative to a roller frame of a track type machine. While the '631 patent discloses some benefits, the idler adjustment assembly of the present disclosure does not require use of removable spacers.

The idler adjustment assembly of the present disclosure solves one or more of the problems set forth above and/or other problems in the art.

SUMMARY

In some implementations, an idler system includes an idler that includes an idler shaft; and an idler adjustment assembly that includes: a support block configured to hold an end of the idler shaft; a first wear component configured to be adjacent to an external surface of a first side of the support block and to have a first alignment relative to the external surface of the first side; a second wear component configured to be adjacent to an external surface of a second side of the support block and to have a second alignment relative to the external surface of the second side; a first set of one or more adjustment components configured to move the first wear component between a first plurality of positions that are adjacent to the external surface of the first side of the support block; a second set of one or more adjustment components configured to move the second wear component between a second plurality of positions that are adjacent to the external surface of the second side of the support block; a first set of one or more alignment components configured to maintain the first alignment of the first wear component relative to the external surface of the first side of the support block; and a second set of one or more alignment components configured to maintain the second alignment of the second wear component relative to the external surface of the second side of the support block.

In some implementations, an idler adjustment assembly includes a support block; a first wear component; a second wear component; a first set of one or more adjustment components configured to move the first wear component between a first plurality of positions that are adjacent to an external surface of a first side of the support block; a second set of one or more adjustment components configured to move the second wear component between a second plurality of positions that are adjacent to an external surface of a second side of the support block; a first set of one or more alignment components configured to maintain a first alignment of the first wear component relative to the external surface of the first side of the support block; and a second set of one or more alignment components configured to maintain a second alignment of the second wear component relative to the external surface of the second side of the support block.

In some implementations, a track system for a track-type machine includes an idler; and an idler adjustment assembly that includes: a support block configured to hold an end of an idler shaft of the idler; a first set of one or more adjustment components configured to move a first wear component between a first plurality of positions that are adjacent to an external surface of a first side of the support block; and a second set of one or more adjustment components configured to move a second wear component between a second plurality of positions that are adjacent to an external surface of a second side of the support block.

DETAILED DESCRIPTION

This disclosure generally relates to an idler adjustment assembly, which is applicable to any track-type machine. For example, the machine may be a dozer, an excavator, a skid-steer loader, or any other track-type machine (e.g., that includes a track system with an idler).

Figure 1:
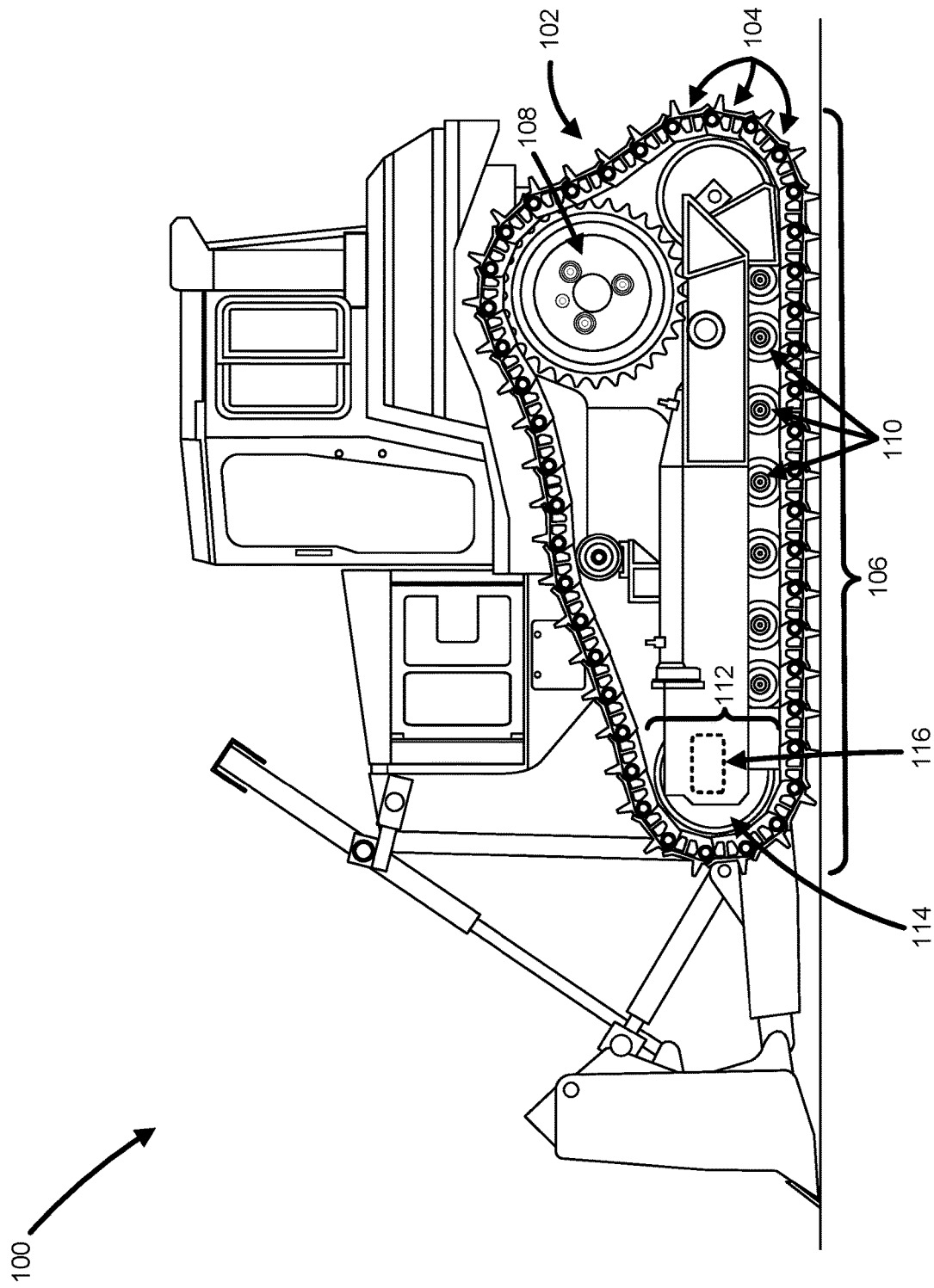
FIG. 1 is a diagram of an example machine described herein.

FIG. 1 is a diagram (e.g., a side-view) of an example machine 100 described herein. As shown in FIG. 1, the machine 100 may be a track-type machine, and may include a track system 102 (e.g., a "left" track system 102) and another track system (e.g., a "right" track system, not shown in FIG. 1, that is similar to, or the same as, the track system 102). The track system 102 includes a plurality of track links 104, pivotally connected to each other to form a track chain 106. As shown in FIG. 1, the track chain 106 surrounds a drive sprocket 108, a plurality of guide rollers 110, and an idler system 112. The idler system 112 may include an idler 114 (e.g., that includes an idler shaft, not shown) and an idler adjustment assembly 116, further described herein.

As indicated above, FIG. 1 is provided as an example. Other examples may differ from what is described in connection with FIG. 1.

Figure 2:
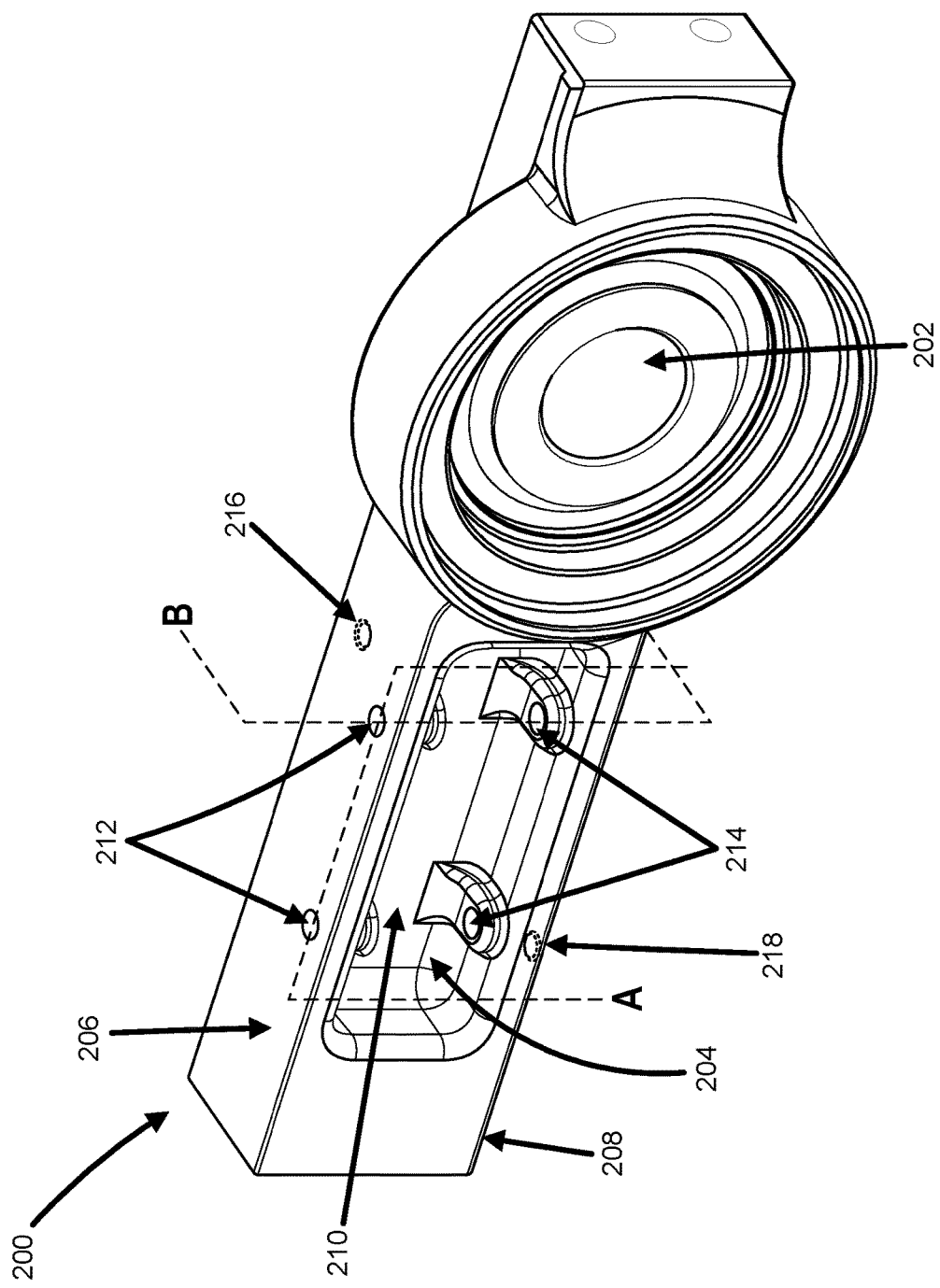
FIG. 2 is a diagram of an example support block of an idler adjustment assembly described herein.

FIG. 2 is a diagram (e.g., an angled side-view) of an example support block 200 of the idler adjustment assembly 116 described herein. The support block 200 may be configured to hold an end of the idler shaft of the idler 114. For example, as shown in FIG. 2, the support block 200 may include a holding component 202 (e.g., a hole, a recess, or another component) that is configured to hold an end of the idler shaft of the idler 114. While FIG. 2, shows the holding component 202 as positioned at a particular end of the support block 200, the holding component may be positioned anywhere on the support block 200 (e.g., in the middle of the support block 200 or at another end of the support block 200).

The support block 200 may be a metal block (e.g., a cast metal block). At least a part of the support block 200 may have a C-shaped cross-section (e.g., as shown in FIGS. 3C-3D) that enables access (e.g., by a tool, such as a wrench) to an internal portion 204 of the support block 200 (e.g., the support block 200 may be "dished out" to provide access to the internal portion 204 of the support block 200). Accordingly, as further shown in FIG. 2, the support block 200 may include a first side 206 (e.g., a top side), a second side 208 (e.g., a bottom side), and a third side 210 (e.g., a back side). The first side 206 may include a first set of one or more bores 212 that are configured to respectively engage with a first set of one or more adjustment components 306, described herein. The second side 208 may include a second set of one or more bores 214 that are configured to respectively engage with a second set of one or more adjustment components 308, described herein. Additionally, or alternatively, the first side 206 may include a first set of one or more alignment features 216 that are configured to respectively engage with a first set of one or more alignment components 310, described herein, and/or the second side 208 may include a second set of one or more alignment features 218 that are configured to respectively engage with a second set of one or more alignment components 312, described herein.

As indicated above, FIG. 2 is provided as an example. Other examples may differ from what is described in connection with FIG. 2.

FIGS. 3A-3D are diagrams of the idler adjustment assembly 116. The idler adjustment assembly 116 may include the support block 200, a first wear component 302, a second wear component 304, a first set of one or more adjustment components 306, a second set of one or more adjustment components 308, a first set of one or more alignment components 310, and a second set of one or more alignment components 312. The first wear component 302 may include a first set of one or more connection subcomponents 314 and/or a first set of one or more alignment subcomponents 316, and the second wear component 304 may include a second set of one or more connection subcomponents 318 and/or a second set of one or more alignment subcomponents 320.

Figure 3A:
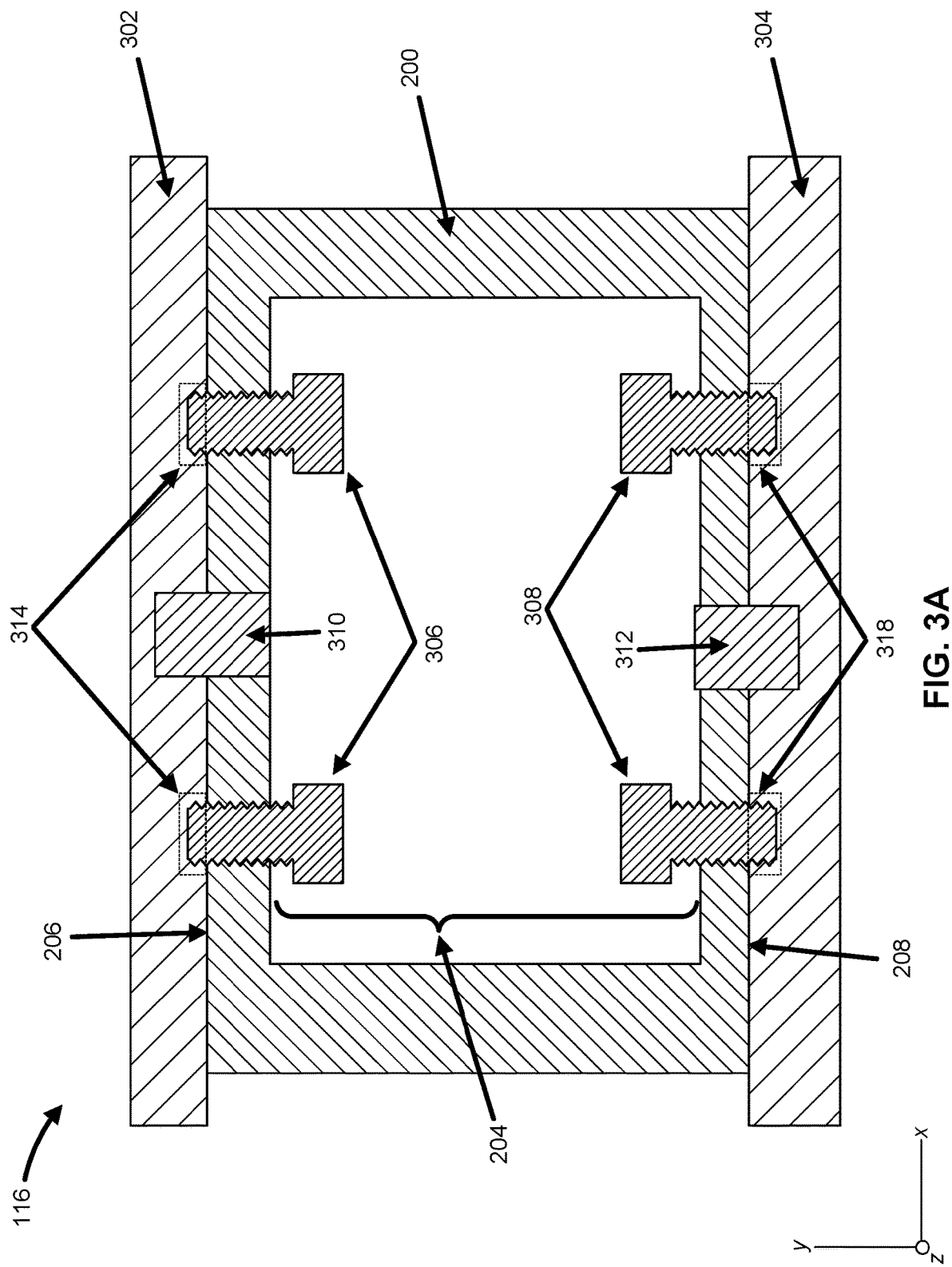
FIGS. 3A-3D are diagrams of the idler adjustment assembly described herein.
Figure 3B:
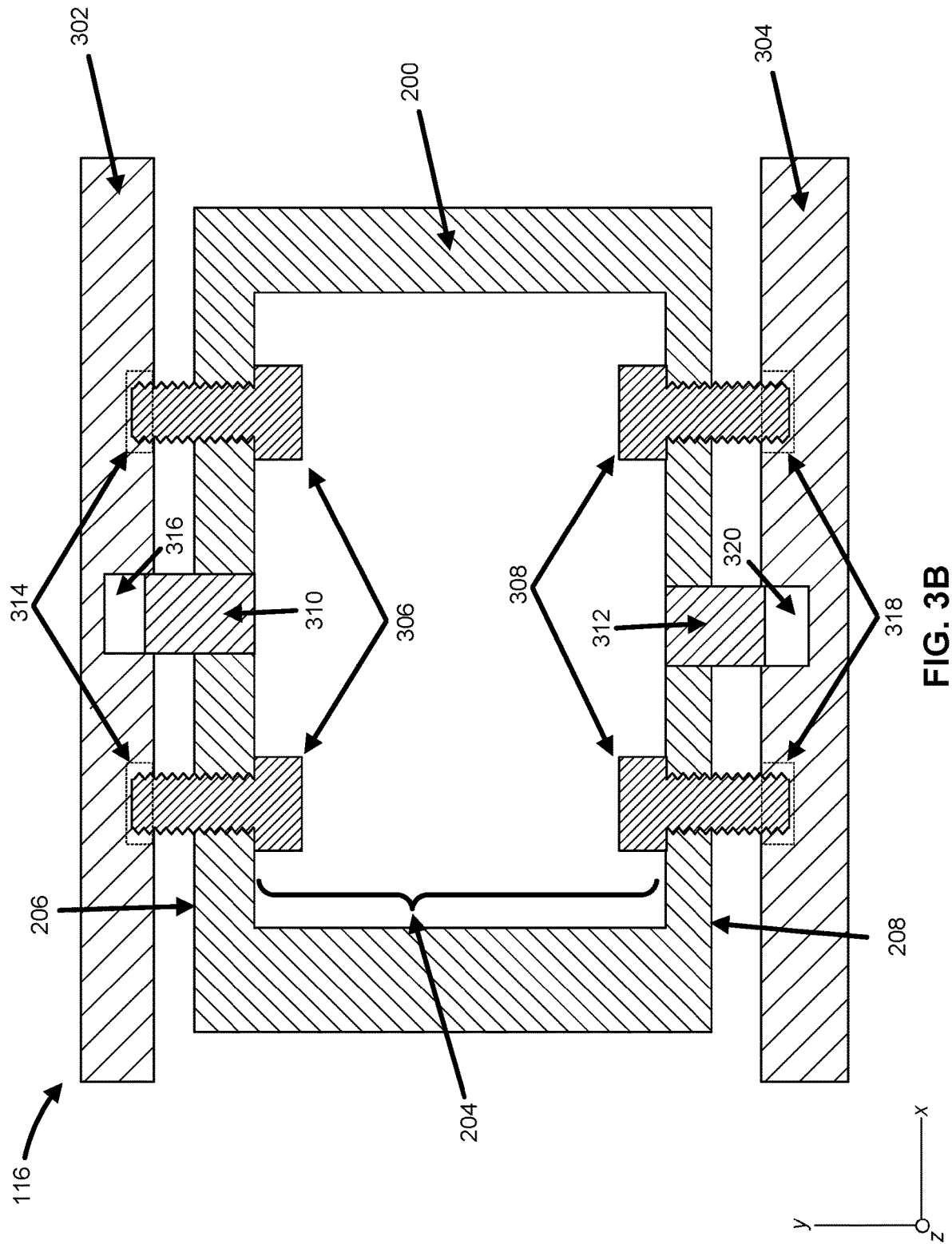
Figure 3C:
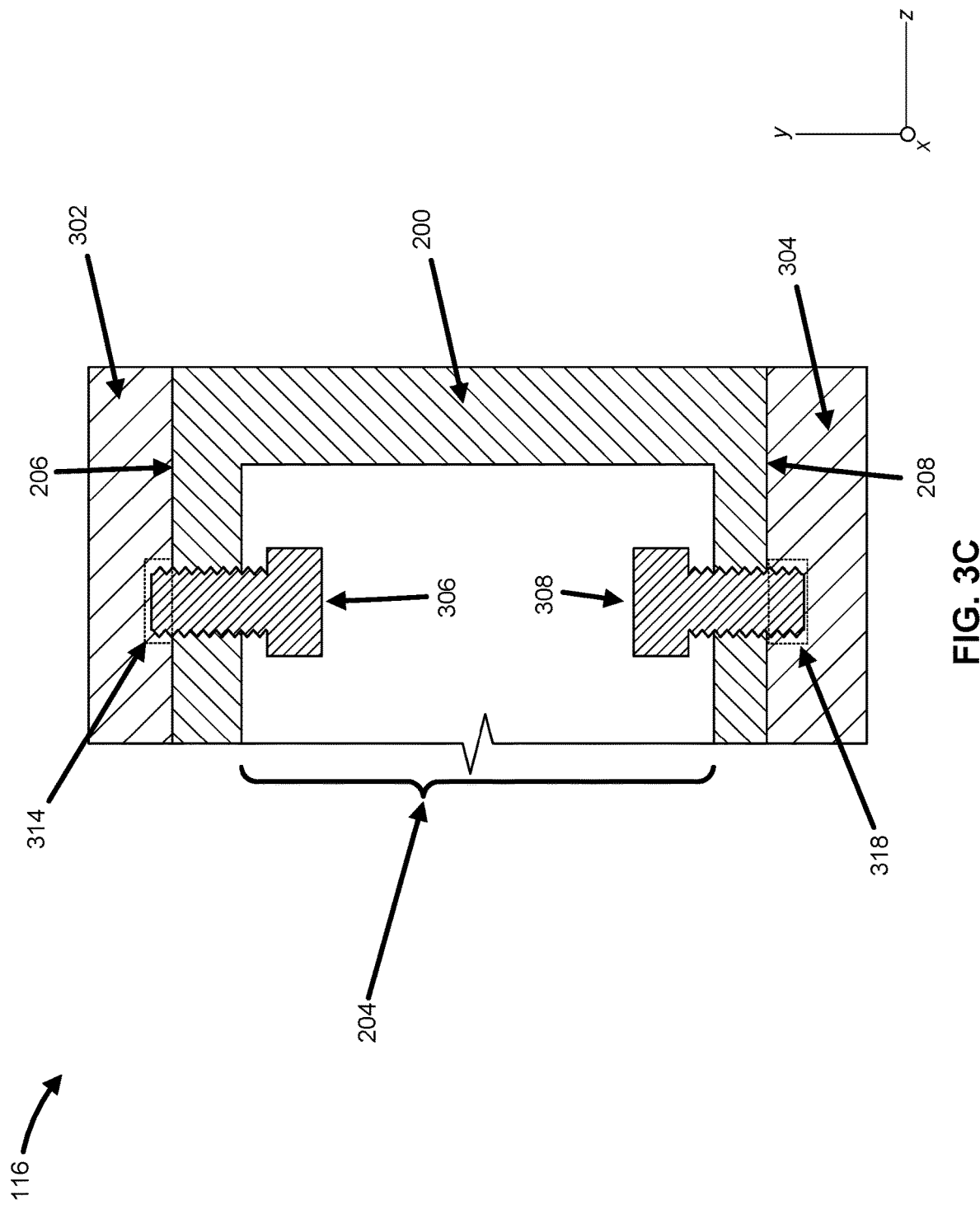
Figure 3D:
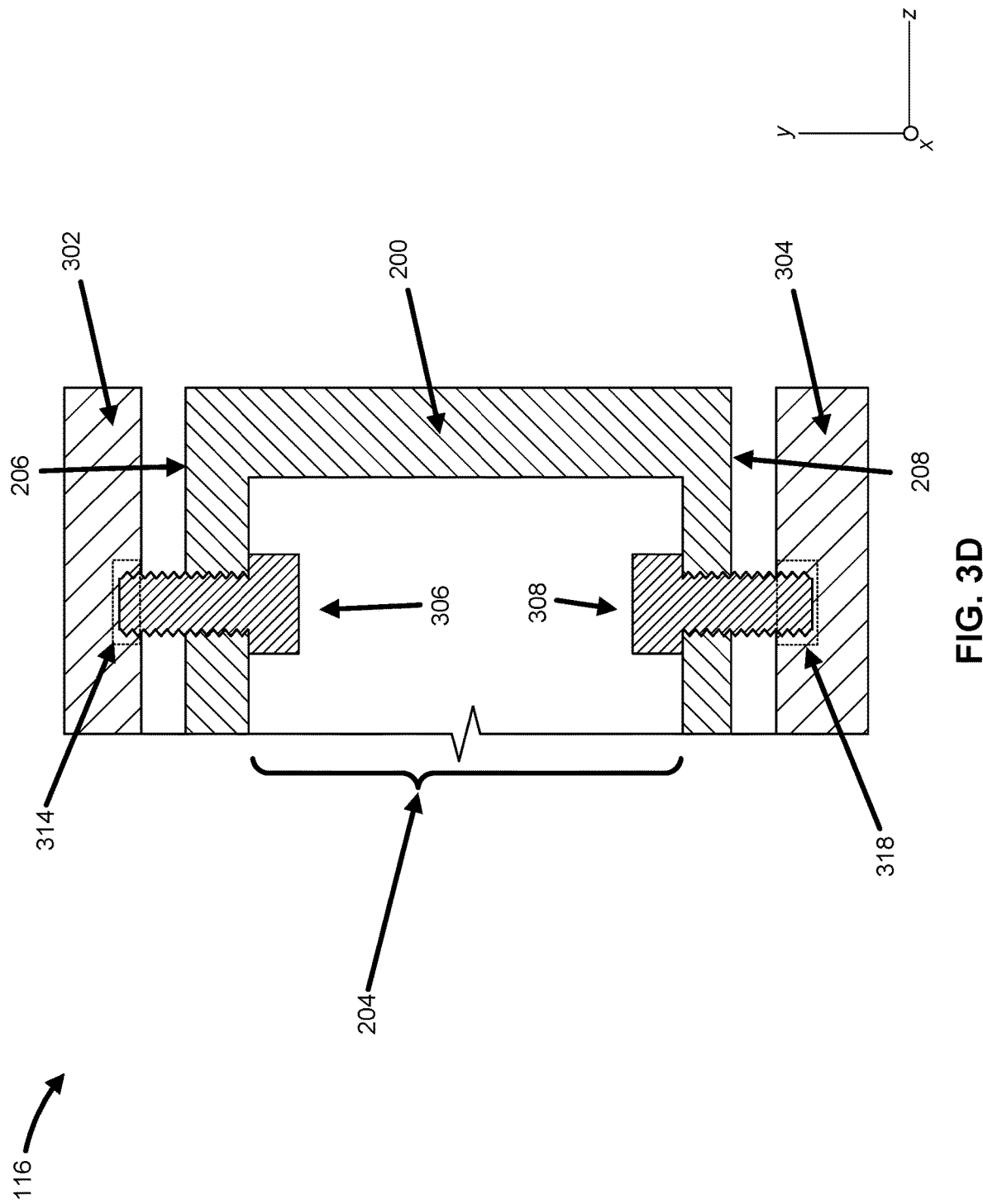

FIGS. 3A-3B show a first cross-sectional view of the idler adjustment assembly 116 (e.g., along a line associated with line A of the support block 200 shown in FIG. 2). FIGS. 3C-3D show a second cross-sectional view of the idler adjustment assembly 116 (e.g., along a line associated with line B of the support block 200 shown in FIG. 2). Relative positions of the components of the idler adjustment assembly 116 (e.g., to each other) are the same, or similar, as shown in FIGS. 3A and 3C, and relative positions of the components of the idler adjustment assembly 116 (e.g., to each other) are the same, or similar, as shown in FIGS. 3B and 3D.

Each of the first wear component 302 and second wear component 304 may be a wear shoe, a wear block, or a similar component that comprises a metal material, a rubber material, a rubber/metal composite material, or a similar material. Each of the first wear component 302 and second wear component 304 may be configured to contact an idler frame (not shown) of the idler system 112 (e.g., the idler frame may be configured to hold the idler 114 and the idler adjustment assembly 116 within the track system 102). Accordingly, each of the first wear component 302 and second wear component 304 may be configured to maintain (e.g., by contacting the idler frame) a particular position of the idler 114 and/or the idler adjustment assembly 116 within the track system 102 (e.g., a particular vertical position within the track system 102).

The first wear component 302 may be configured to be adjacent to an external surface of the first side 206 of the support block 200. For example, as shown in FIGS. 3A-3D, the first wear component 302 may be configured to be disposed above the external surface of the first side 206 of the support block 200. As further described herein, the first wear component 302 may be configured to be moved, by the first set of one or more adjustment components 306, between a first plurality of positions that are adjacent to the external surface of the first side 206 of the support block 200 (e.g., between a plurality of positions that are disposed above the external surface of the first side 206 of the support block 200). For example, as shown in FIGS. 3A and 3C, the first wear component 302 may be positioned at a first position, of the first plurality of positions, such that the first wear component 302 contacts the external surface of the first side 206 of the support block 200, and, as shown in FIGS. 3B and 3D, the first wear component 302 may be positioned at a second position, of the first plurality of positions, such that the first wear component 302 does not contact the external surface of the first side 206 of the support block 200.

In some implementations, each position of the first plurality of positions may be a different distance from the external surface of the first side 206 of the support block 200. Accordingly, the first wear component 302 may be positioned at a particular position, of the first plurality of positions, such that the first wear component 302 is a particular distance from the external surface of the first side 206 of the support block 200, wherein the particular distance satisfies (e.g., is greater than or equal to) a distance threshold. The distance threshold may be greater than or equal to, for example, 10 millimeters (mm), 25 mm, or 50 mm.

The second wear component 304 may be configured to be adjacent to an external surface of the second side 208 of the support block 200. For example, as shown in FIGS. 3A-3B, the second wear component 304 may be configured to be disposed below the external surface of the second side 208 of the support block 200. As further described herein, the second wear component 304 may be configured to be moved, by the second set of one or more adjustment components 308, between a second plurality of positions that are adjacent to the external surface of the second side 208 of the support block 200 (e.g., between a plurality of positions that are disposed below the external surface of the second side 208 of the support block 200). For example, as shown in FIGS. 3A and 3C, the second wear component 304 may be positioned at a first position, of the second plurality of positions, such that the second wear component 304 contacts the external surface of the second side 208 of the support block 200, and, as shown in FIGS. 3B and 3D, the second wear component 304 may be positioned at a second position, of the second plurality of positions, such that the second wear component 304 does not contact the external surface of the second side 208 of the support block 200.

In some implementations, each position of the second plurality of positions may be a different distance from the external surface of the second side 208 of the support block 200. Accordingly, the second wear component 304 may be positioned at a particular position, of the second plurality of positions, such that the second wear component 304 is a particular distance from the external surface of the second side 208 of the support block 200, wherein the particular distance satisfies (e.g., is greater than or equal to) a distance threshold. The distance threshold may be greater than or equal to, for example, 10 mm, 25 mm, or 50 mm.

Additionally, or alternatively, the first wear component 302, when positioned at a first position, of the first plurality of positions, may be a first distance from the external surface of the first side 206 of the support block 200, and the second wear component 304, when positioned at a second position, of the second plurality of positions, may be a second distance from the external surface of the second side 208 of the support block 200. The first distance may be the same as the second distance (e.g., the first distance may equal the second distance), or the first distance may be different than the second distance (e.g., the first distance may not equal the second distance).

The first set of one or more adjustment components 306 may be configured to move the first wear component 302 between the first plurality of positions that are adjacent to the external surface of the first side 206 of the support block 200. For example, as shown in FIGS. 3A-3D, the first set of one or more adjustment components 306 may be configured to move the first wear component 302 along a first axis (e.g., ay-axis) of the idler adjustment assembly 116. The second set of one or more adjustment components 308 may be configured to move the second wear component 304 between the second plurality of positions that are adjacent to the external surface of the second side 208 of the support block 200. For example, as shown in FIGS. 3A-3D, the second set of one or more adjustment components 308 may be configured to move the second wear component 304 along the first axis of the idler adjustment assembly 116. The first axis may be orthogonal to the external surface of the first side 206 of the support block 200 and/or to the external surface of the second side 208 of the support block 200.

Each adjustment component 306, of the first set of one or more adjustment components 306, may be an adjustment fastener. Accordingly, each adjustment component 306 may be configured to be disposed within a corresponding bore 212, of the first set of one or more bores 212, of the first side 206 of the support block 200 and to be connected to a corresponding connection subcomponent 314, of the first set of one or more connection subcomponents 314, of the first wear component 302. For example, as shown in FIGS. 3A-3D, each adjustment component 306 may be a threaded fastener that includes a first end configured to connect to the corresponding connection subcomponent 314, a threaded shank configured to be disposed within and engage with the corresponding bore 212, and a second end configured to extend into the internal portion 204 of the support block 200. The corresponding connection subcomponent 314 may include a nut (e.g., a lock nut), a washer (e.g., a lock washer), and/or a similar structure configured to maintain a connection of the adjustment component 306 to the first wear component 302. The corresponding bore 212 may be a threaded bore (e.g., a bore that includes a threaded insert, a threaded bushing, and/or a similar structure) configured to engage with the threaded shank of the adjustment component 306. The second end of the adjustment component 306 may include an engagement head (e.g., a hexagonal head or a similar structure) that is configured to engage with a tool (e.g., a wrench).

Accordingly, an operator of the machine 100 may use the tool to rotate the adjustment component 306 (e.g., counter-clockwise or clockwise along a rotation axis of the adjustment component 306) and thereby cause the first wear component 302 (or a portion of the first wear component 302 associated with the corresponding connection subcomponent 314) to move along the first axis of the idler adjustment assembly 116 (e.g., up or down, along the y-axis). In this way, the operator may use the tool to engage with each of the first set of one or more adjustment components 306 to cause the first wear component 302 to move between the first plurality of positions that are adjacent to the external surface of the first side 206 of the support block 200 (e.g., as shown in FIGS. 3A-3D).

Each adjustment component 308, of the second set of one or more adjustment components 308, may be an adjustment fastener. Accordingly, each adjustment component 308 may be configured to be disposed within a corresponding bore 214, of the second set of one or more bores 214, of the second side 208 of the support block 200 and to be connected to a corresponding connection subcomponent 318, of the second set of one or more connection subcomponents 318, of the second wear component 304. For example, as shown in FIGS. 3A-3D, each adjustment component 308 may be a threaded fastener that includes a first end configured to connect to the corresponding connection subcomponent 318, a threaded shank configured to be disposed within and engage with the corresponding bore 214, and a second end configured to extend into the internal portion 204 of the support block 200. The corresponding connection subcomponent 318 may include a nut (e.g., a lock nut), a washer (e.g., a lock washer), and/or a similar structure configured to maintain a connection of the adjustment component 308 to the second wear component 304. The corresponding bore 214 may be a threaded bore (e.g., a bore that includes a threaded insert, a threaded bushing, and/or a similar structure) configured to engage with the threaded shank of the adjustment component 308. The second end of the adjustment component 308 may include an engagement head (e.g., a hexagonal head or a similar structure) that is configured to engage with a tool (e.g., a wrench).

Accordingly, an operator of the machine 100 may use the tool to rotate the adjustment component 308 (e.g., counter-clockwise or clockwise along a rotation axis of the adjustment component 308) and thereby cause the second wear component 304 (or a portion of the second wear component 304 associated with the corresponding connection subcomponent 318) to move along the first axis of the idler adjustment assembly 116 (e.g., up or down, along they-axis). In this way, the operator may use the tool to engage with each of the second set of one or more adjustment components 308 to cause the second wear component 304 to move between the second plurality of positions that are adjacent to the external surface of the second side 208 of the support block 200 (e.g., as shown in FIGS. 3A-3D).

In some implementations, the first wear component 302 may be configured to have a first alignment relative to the external surface of the first side 206 of the support block 200. For example, each of a top side of the first wear component 302 and the external side of the first side 206 may have a rectangular shape (e.g., from a top-down point of view). Accordingly, the first wear component 302 may have the first alignment relative to the external side of the first side 206 (e.g., when the first wear component 302 is adjacent to the external surface of the first side 206) such that the edges of top side of the first wear component 302 are respectively parallel with corresponding edges of the external surface of the first side 206.

The first set of one or more alignment components 310 may be configured to maintain the first alignment of the first wear component 302 relative to the external surface of the first side 206 of the support block 200. For example, the first set of one or more alignment components 310 may be configured to resist movement of the first wear component 302 along a second axis (e.g., an x-axis) and/or a third axis (e.g., a z-axis) of the idler adjustment assembly 116 (e.g., where the second axis and the third axis are orthogonal to the first axis of the idler adjustment assembly 116). That is, the first set of one or more alignment components 310 may be configured to allow movement of the first wear component 302 along the first axis (e.g., the y-axis) of the idler adjustment assembly 116, but not in any other direction. In this way, with respect to the example above, the first set of one or more alignment components 310 may be configured to maintain the first alignment of the first wear component 302 such that the edges of top side of the first wear component 302 remain respectively parallel with corresponding edges of the external surface of the first side 206.

In some implementations, each alignment component 310, of the first set of one or more alignment components 310, may be part of the external surface of the first side 206 of the support block 200. For example, each alignment component 310 may be integrated into the external surface of the first side 206 (e.g., as a protrusion or a similar structure) and may be configured to engage with a corresponding alignment subcomponent 316 (e.g., a depression or a similar structure), of the first set of one or more alignment subcomponents 316, of the first wear component 302. Alternatively, each alignment component 310, of the first set of one or more alignment components 310, may be a dowel, a peg, or a similar structure. For example, each alignment component 310 may be a dowel, that fits into, and engages with, both an alignment feature 216 (e.g., a depression or a similar structure), of the first set of one or more alignment features 216 of the external surface of the first side 206, and a corresponding alignment subcomponent 316 (e.g., a depression or a similar structure), of the first set of one or more alignment subcomponents 316, of the first wear component 302.

In some implementations, the second wear component 304 may be configured to have a second alignment relative to the external surface of the second side 208 of the support block 200. For example, each of a bottom side of the second wear component 304 and the external side of the second side 208 may have a rectangular shape (e.g., from a bottom-up point of view). Accordingly, the second wear component 304 may have the second alignment relative to the external side of the second side 208 (e.g., when the second wear component 304 is adjacent to the external surface of the second side 208) such that the edges of the bottom side of the second wear component 304 are respectively parallel with corresponding edges of the external surface of the second side 208.

The second set of one or more alignment components 312 may be configured to maintain the second alignment of the second wear component 304 relative to the external surface of the second side 208 of the support block 200. For example, the second set of one or more alignment components 312 may be configured to resist movement of the second wear component 304 along the second axis (e.g., the x-axis) and/or the third axis (e.g., the z-axis) of the idler adjustment assembly 116. That is, the second set of one or more alignment components 312 may be configured to allow movement of the second wear component 304 along the first axis (e.g., the y-axis) of the idler adjustment assembly 116, but not in any other direction. In this way, with respect to the example above, the second set of one or more alignment components 312 may be configured to maintain the second alignment of the second wear component 304, such that the edges of the bottom side of the second wear component 304 remain respectively parallel with corresponding edges of the external surface of the second side 208.

In some implementations, each alignment component 312, of the second set of one or more alignment components 310, may be part of the external surface of the second side 208 of the support block 200. For example, each alignment component 312 may be integrated into the external surface of the second side 208 (e.g., as a protrusion or a similar structure) and may be configured to engage with a corresponding alignment subcomponent 320 (e.g., a depression or a similar structure), of the second set of one or more alignment subcomponents 320, of the second wear component 304. Alternatively, each alignment component 312, of the second set of one or more alignment components 312, may be a dowel, a peg, or a similar structure. For example, each alignment component 312 may fit into, and engage with, both an alignment feature 218 (e.g., a depression or a similar structure), of the second set of one or more alignment features 218 of the external surface of the second side 208, and a corresponding alignment subcomponent 320 (e.g., a depression or a similar structure), of the second set of one or more alignment subcomponents 320, of the second wear component 304.

As indicated above, FIGS. 3A-3D are provided as an example. Other examples may differ from what is described in connection with FIGS. 3A-3D.

INDUSTRIAL APPLICABILITY

The disclosed idler adjustment assembly may be used in any track-type machine that utilizes a track system with an idler. In many cases, an idler needs to be adjusted (e.g., a position of the idler within a track system needs to be adjusted), such as to facilitate smooth operation of the track system across a ground surface and/or to account for wear of the idler and/or other components of the track system. Typically, a human operator performs a time-consuming and labor-intensive process to attempt to adjust the idler. For example, the human operator loosens fastener components associated with the idler and an idler adjuster (e.g., that includes a frame and at least one wear component); determines a particular distance that the idler is to be adjusted; identifies, based on the particular distance, a particular number of shims, one or more springs of a particular length, or other block material to insert between the frame and the at least one wear component; inserts the particular number of shims, the one or more springs of the particular length, or the other block material between the frame and the at least one wear component; and tightens the fastener components associated with the idler and the idler adjuster. However, this process can be inaccurate (e.g., the idler may not be adjusted by the particular distance), such as based on a limited availability of shims of particular thicknesses, springs of particular length, and/or of block material of a particular thickness. For example, the human operator may only be able to adjust the idler by discrete distance increments, and therefore may adjust the idler to a non-optimal position (e.g., may adjust the idler too much or too little) within the track system.

This can affect a performance and/or an operable life of the idler, the idler adjuster, the track system, and/or the track-type machine. For example, an incorrectly adjusted idler has a higher likelihood of causing "an impact region" of the track system to impact the ground surface at a non-optimal angle, which causes the track system to roll non-smoothly (e.g., with more than an optimal amount of bounce) across the ground surface. This increases an amount of stress and/or wear exerted on the idler, the idler adjuster, the track system, and/or the track-type machine over time, thereby affecting longevity and performance.

The idler adjustment assembly described herein includes a support block, a first wear component, a second wear component, a first set of one or more adjustment components configured to move the first wear component between a first plurality of positions that are adjacent to an external surface of a first side of the support block, and a second set of one or more adjustment components configured to move the second wear component between a second plurality of positions that are adjacent to an external surface of a second side of the support block. Accordingly, to adjust the first wear component, a human operator engages (e.g., using a tool, such as a wrench) the first set of one or more adjustment components, and to adjust the second wear component, the human operator engages the second set of one or more adjustment components. In this way, the human operator is able to adjust an idler (e.g., that is associated with the idler adjustment assembly) by moving at least one of the first set of one or more adjustment components or the second set of one or more adjustment components. No other shims, springs, and/or block material are needed to adjust the idler.

Further, the human operator is able to move the first wear component and the second wear component by any amount (e.g., not just discrete, incremental amounts), thereby increasing a likelihood that the idler is adjusted to an optimal position within a track system of a track-type machine. This improves a performance and/or an operable life of the idler, the idler adjustment assembly, the track system, and/or the track-type machine (e.g., as compared to using a typical idler adjuster). For example, a correctly adjusted idler has a higher likelihood of causing the impact region of the track system to impact the ground surface at an optimal angle, which causes the track system to roll smoothly (e.g., with minimal bounce) across a ground surface. Therefore an amount of stress and/or wear exerted on the idler, the idler adjustment assembly, the track system, and/or the track-type machine is reduced over time, thereby improving longevity and performance.

What is claimed is:

1. An idler system, comprising:
   an idler that includes an idler shaft; and
   an idler adjustment assembly that includes:
      a support block configured to hold an end of the idler shaft;
      a first wear component configured to be adjacent to an external surface of a first side of the support block and to have a first alignment relative to the external surface of the first side of the support block;
      a second wear component configured to be adjacent to an external surface of a second side of the support block and to have a second alignment relative to the external surface of the second side of the support block;
      a first set of one or more adjustment components configured to move the first wear component between a first plurality of positions that are adjacent to the external surface of the first side of the support block;
      a second set of one or more adjustment components configured to move the second wear component between a second plurality of positions that are adjacent to the external surface of the second side of the support block;
      a first set of one or more alignment components configured to maintain the first alignment of the first wear component relative to the external surface of the first side of the support block; and
      a second set of one or more alignment components configured to maintain the second alignment of the second wear component relative to the external surface of the second side of the support block,
         wherein each adjustment component, of the first set of one or more adjustment components, is a threaded fastener, wherein the threaded fastener includes:
            an engagement head in an internal portion of the support block, and
            a threaded shank, extending through a corresponding threaded bore of the first side of the support block, having a first portion and a second portion extending from the first portion,
               wherein the first portion is connected to the engagement head, and
               wherein the second portion is a distal end of the threaded shank and is connected to a corresponding connection subcomponent of the first wear component.

2. The idler system of claim 1, wherein each alignment component, of the second set of one or more alignment components, is integrated into an external surface of the first side of the support block as a protrusion configured to engage with a corresponding depression of the first wear component.

3. The idler system of claim 1, wherein the first set of one or more adjustment components is configured to move the first wear component along a first axis of the idler adjustment assembly and the second set of one or more adjustment components is configured to move the second wear component along the first axis of the idler adjustment assembly,
   wherein the first axis is orthogonal to both the external surface of the first side of the support block and the external surface of the second side of the support block.

4. The idler system of claim 3, wherein the first set of one or more alignment components is configured to resist movement of the first wear component along a second axis of the idler adjustment assembly and the second set of one or more alignment components is configured to resist movement of the second wear component along the second axis of the idler adjustment assembly,
   wherein the second axis is orthogonal to the first axis.

5. The idler system of claim 1, wherein:
   the first wear component, when positioned at a first position, of the first plurality of positions, contacts the external surface of the first side of the support block; and the first wear component, when positioned at a second position, of the first plurality of positions, does not contact the external surface of the first side of the support block.

6. The idler system of claim 1, wherein:
the first wear component, when positioned at a first position, of the first plurality of positions, is a first distance from the external surface of the first side of the support block; and
the second wear component, when positioned at a second position, of the second plurality of positions, is a second distance from the external surface of the second side of the support block,
wherein the second distance is different than the first distance.

7. The idler system of claim 1, wherein the first wear component and the second wear component of the idler adjustment assembly are configured to contact an idler frame associated with the idler system.

8. The idler system of claim 1, wherein:
the first set of one or more adjustment components comprises a first plurality of adjustment components,
the second set of one or more adjustment components comprises a second plurality of adjustment components,
the first set of one or more alignment components comprises a single first alignment component,
wherein the single first alignment component is between the first plurality of adjustment components, and
the second set of one or more alignment components comprises a single second alignment component,
wherein the single second alignment component is between the second plurality of adjustment components.

9. The idler system of claim 1, wherein each alignment component, of the first set of one or more alignment components, engaging with a depression in the first wear component.

10. An idler adjustment assembly, comprising:
a support block;
a first wear component;
a second wear component;
a first set of one or more adjustment components configured to move the first wear component between a first plurality of positions that are adjacent to an external surface of a first side of the support block;
a second set of one or more adjustment components configured to move the second wear component between a second plurality of positions that are adjacent to an external surface of a second side of the support block;
a first set of one or more alignment components configured to maintain a first alignment of the first wear component relative to the external surface of the first side of the support block; and
a second set of one or more alignment components configured to maintain a second alignment of the second wear component relative to the external surface of the second side of the support block,
wherein each adjustment component, of the first set of one or more adjustment components, is a threaded fastener, wherein the threaded fastener includes:
an engagement head in an internal portion of the support block, and
a threaded shank comprising:
a first portion connected to the engagement head and extending through a corresponding threaded bore of the first side of the support block, and
a second portion extending from the first portion and connected to a corresponding connection subcomponent of the first wear component.

11. The idler adjustment assembly of claim 10, wherein the first set of one or more adjustment components is configured to move the first wear component along a first axis of the idler adjustment assembly.

12. The idler adjustment assembly of claim 11, wherein the first set of one or more alignment components is configured to resist movement of the first wear component along a second axis of the idler adjustment assembly.

13. The idler adjustment assembly of claim 10, wherein:
the first wear component, when positioned at a first position, of the first plurality of positions, is a first distance from the external surface of the first side of the support block; and
the second wear component, when positioned at a second position, of the second plurality of positions, is a second distance from the external surface of the second side of the support block,
wherein the second distance is different than the first distance.

14. The idler adjustment assembly of claim 10, wherein:
the first wear component, when positioned at a first position, of the first plurality of positions, is a first distance from the external surface of the first side of the support block; and
the second wear component, when positioned at a second position, of the second plurality of positions, is a second distance from the external surface of the second side of the support block,
wherein the second distance is the same as the first distance.

15. A track system for a track-type machine, comprising:
an idler; and
an idler adjustment assembly that includes:
a support block configured to hold an end of an idler shaft of the idler;
a first set of one or more adjustment components configured to move a first wear component between a first plurality of positions that are adjacent to an external surface of a first side of the support block; and
a second set of one or more adjustment components configured to move a second wear component between a second plurality of positions that are adjacent to an external surface of a second side of the support block,
wherein each adjustment component, of the first set of one or more adjustment components, is a threaded fastener, wherein the threaded fastener includes:
an engagement head in an internal portion of the support block, and
a threaded shank comprising:
a first portion connected to the engagement head and extending through a corresponding threaded bore of the first side of the support block, and
a second portion extending from the first portion and connected to a corresponding connection subcomponent of the first wear component.

16. The track system of claim 15, wherein the idler adjustment assembly further includes:
- a first set of one or more alignment components configured to maintain a first alignment of the first wear component relative to the external surface of the first side of the support block; and
- a second set of one or more alignment components configured to maintain a second alignment of the second wear component relative to the external surface of the second side of the support block.

17. The track system of claim 16, wherein:
the first set of one or more adjustment components comprises a first plurality of adjustment components,
the second set of one or more adjustment components comprises a second plurality of adjustment components,
the first set of one or more alignment components comprises a single first alignment component,
- wherein the single first alignment component is between the first plurality of adjustment components, and
the second set of one or more alignment components comprises a single second alignment component,
- wherein the single second alignment component is between the second plurality of adjustment components.

18. The track system of claim 16, wherein each alignment component, of the first set of one or more alignment components, engaging with a depression in the first wear component.

19. The track system of claim 15, wherein the first set of one or more adjustment components is configured to move the first wear component along a first axis of the idler adjustment assembly.

20. The track system of claim 15, wherein:
the first wear component, when positioned at a particular position, of the first plurality of positions, is a particular distance from the external surface of the first side of the support block,
wherein the particular distance satisfies a distance threshold.

* * * * *